United States Patent
Kamba (10) Patent No.: US 6,657,638 B2
(45) Date of Patent: Dec. 2, 2003

(54) DATA PROCESSING UNIT, DATA PROCESSING SYSTEM, AND DATA DISPLAY CONTROL METHOD

(75) Inventor: Tomonari Kamba, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/440,465

(22) Filed: Nov. 15, 1999

(65) Prior Publication Data

US 2002/0109720 A1 Aug. 15, 2002

(30) Foreign Application Priority Data

Nov. 20, 1998 (JP) .......................................... 10-330371

(51) Int. Cl.$^7$ ................................................ G09G 5/12
(52) U.S. Cl. ........................ 345/632; 345/762; 345/864
(58) Field of Search ................................ 345/153, 778, 345/1.2, 3.2, 214, 56, 59, 864, 504, 600–610, 619–632, 733–768, 969; 341/50–61; 707/6–10, 200–206; 705/22, 28

(56) References Cited

U.S. PATENT DOCUMENTS

| | | | |
|---|---|---|---|
| 5,701,423 A | * 12/1997 | Crozier et al. | 345/762 |
| 5,802,381 A | * 9/1998 | Matsumoto et al. | 707/517 |
| 5,845,283 A | * 12/1998 | Williams et al. | 707/101 |
| 6,034,314 A | * 3/2000 | Koike | 84/600 |

FOREIGN PATENT DOCUMENTS

| | | |
|---|---|---|
| JP | 6-75913 A | 3/1994 |
| JP | 6-161918 A | 6/1994 |
| JP | 6-168211 A | 6/1994 |
| JP | 7-175616 A | 7/1995 |
| JP | 8-87548 A | 4/1996 |
| JP | 9-6693 | 1/1997 |
| JP | 9-97150 A | 4/1997 |
| JP | 9-134304 A | 5/1997 |
| JP | 9-223060 | 8/1997 |
| JP | 10-289084 A | 10/1998 |

\* cited by examiner

Primary Examiner—Michael Razavi
Assistant Examiner—Thu-Thao Havan
(74) Attorney, Agent, or Firm—Sughrue Mion, PLLC (57) ABSTRACT

The present invention provides a data processing unit which allows schedule data, address data, and so on, to be synchronized between a plurality of terminals each with its own screen display capability such as a screen size and available display colors and user attributes. The data processing unit comprises a communication control unit for communicating with other terminals, a synchronous data storing unit for storing data synchronized by the communication control unit, a data conversion rule storing unit for storing a data conversion rule provided in accordance with the screen display capability or the user attributes, a data conversion unit for converting the data received from the synchronous data storing unit based on the data conversion rule, a converted data storing unit for storing the converted data, and a display unit for displaying the converted data.

4 Claims, 10 Drawing Sheets

```
<MONTH>APRIL
<DAY>1
<GENRE>MEETING</GENRE>
<TIME>10:00-12:00</TIME>
<PLACE>16TH CONFERENCE ROOM AT HEAD OFFICE </PLACE>
<PARTICIPANT>HEAD OF DEPARTMENT OF COMPANY A, CHIEF OF SECTION OF COMPANY
B</PARTICIPANT>
<CONTENT>CONFIRM CONTRACT CONTENTS</CONTENT>
</DAY>
<DAY>2
•
•
•
</DAY>
•
•
•
</MONTH>
```

FIG. 4

| | |
|---|---|
| GENRE | : MEETING |
| TIME | : YES |
| PLACE | : YES |
| OTHERS | : NO |
| GENRE | : VISIT |
| TIME | : YES |
| DESTINATION | : YES |
| OTHERS | : NO |

FIG. 5

```
<MONTH>APRIL
<DAY>1
<GENRE>MEETING</GENRE>
<TIME>10:00-12:00</TIME>
<PLACE>16TH CONFERENCE ROOM AT HEAD OFFICE </PLACE>
<DAY>2
•
•
•
</DAY>
•
•
•
</MONTH>
```

```
<MONTH>APRIL
<DAY>1
<GENRE>MEETING</GENRE>
<TIME>10:00-12:00</TIME>
<PLACE>16TH CONFERENCE ROOM AT HEAD OFFICE </PLACE>
<PARTICIPANT>HEAD OF DEPARTMENT OF COMPANY A, CHIEF OF SECTION OF COMPANY
B</PARTICIPANT>
<CONTENT>CONFIRM CONTRACT CONTENTS</CONTENT>
</DAY>
<DAY>2

</DAY>

</MONTH>
<CONVERSION RULE>
<SCREEN SIZE>WIDTH:640 OR MORE   HEIGHT :480 OR MORE</SCREEN SIZE..>
<GENRE>MEETING</GENRE>
<EFFECTIVE ATTRIBUTE>TIME, PLACE, PARTICIPANT, CONTENT </EFFECTIVE ATTRIBUTE>
<SCREEN SIZE>WIDTH:320 OR MORE AND LESS THAN 640   HEIGHT: 240 OR MORE
AND LESS THAN 480</SCREEN SIZE>
<GENRE> MEETING</GENRE>
<EFFECTIVE ATTRIBUTE>TIME, PLACE, PARTICIPANT </EFFECTIVE ATTRIBUTE>
<SCREEN SIZE>WIDTH:LESS THAN 320  HEIGHT: LESS THAN 240</SCREEN SIZE>
<GENRE>MEETING</GENRE>
<EFFECTIVE ATTRIBUTE>TIME, PLACE </EFFECTIVE ATTRIBUTE>
```

FIG. 10

APRIL

| SUNDAY | MONDAY | TUESDAY |
|--------|--------|---------|
| 1 | 2 | 3 |

10:00-12:00 MEETING
16TH CONFERENCE ROOM AT HEAD OFFICE
HEAD OF DEPARTMENT OF COMPANY A, CHIEF OF SECTION OF COMPANY B
CONFIRM CONTRACT CONTENTS

FIG. 11

APRIL

| SUNDAY | MONDAY | TUESDAY |
|--------|--------|---------|
| 1 | 2 | 3 |

10:00-12:00 MEETING
16TH CONFERENCE ROOM AT HEAD OFFICE

FIG. 12

DATA PROCESSING UNIT, DATA PROCESSING SYSTEM, AND DATA DISPLAY CONTROL METHOD

FIELD OF THE INVENTION

The present invention relates to a data processing unit and a data processing system, and more particularly to a data processing unit for use when it is necessary to synchronize data between a plurality of data processing terminals each with its own screen display capability and user attribute.

BACKGROUND OF THE INVENTION

Many systems and methods, which synchronize data between different data processing terminals, have been proposed. For example, Japanese Patent Kokai Publication JP-A No. Hei 9-6693 discloses a method for automatically synchronizing schedule data between a desktop personal computer and a portable data processing terminal. The method adds operation attribute data that represents operation on data, as well as same-data identification attribute data that is specific to data, to data transferred between data processing units. During data synchronization among data processing units, the method searches for data that has been changed from the previous synchronized operation based on the operation attribute data and the same-data identification attribute data added to the data and, for the data obtained from the search, performs synchronization processing based on the operation attribute data and the same-data identification attribute data added to the data. Also, Japanese Patent Kokai Publication JP-A No. Hei 9-223060 discloses a method for comparing the revision of data stored on a portable terminal and the revision of the corresponding data stored in the data processing system and, upon detecting that, as a result of comparison, the data stored on the portable terminal is old, automatically updates the portable terminal data to the latest data by data updating means when the portable terminal is connected to the data processing system.

SUMMARY OF THE DISCLOSURE

However, it has turned out in the course of investigation toward the present invention, that the prior art described above has the following problems. That is, the method according to the prior art may be conveniently used when the same information is displayed on all user's displays of different terminals, but is not useful when information to be displayed differs slightly from terminal to terminal. For example, a schedule message saying "from 10:00 to 12:00 on April 1, a meeting is to be held with the head of a department of company A and the chief of a section of company B in the $16^{th}$ conference room at the head office to confirm the contents of the contract" (information A) may be displayed on the screen of the display of a desktop personal computer at a time. However, on a portable terminal with a small display screen, the screen must be scrolled to display all this information.

In this case, a message saying "a meeting is to be held in the $16^{th}$ conference room at the head office from 10:00 to 12:00 on April 1" (information B) would be enough on the portable terminal.

Portable terminals have become more versatile, ranging from notebook personal computers with the screen size at least 640×480 pixels to portable terminals with small screens similar to those of pagers. Some users use a plurality of terminals according to the situation.

In particular, an attempt to display a large amount of information on a small-size screen requires the user to do complicated operations to read all information. Sometimes, the user may want a reduced amount of display information. With a relatively lengthy message on a portable terminal with a small screen, the user does not always view an entire message, from beginning to end, because of complicated operations and, therefore, he or she sometimes fails to read important information.

Even when schedule data, which is synchronized, is displayed on different data processing terminals, the data must be automatically converted according to the attributes of each terminal. However, the technologies according to the prior art, such as those disclosed in Japanese Patent Kokai Publication JP-A No. Hei 9-6693 and Japanese Patent Kokai Publication JP-A No. Hei 9-223060, only save the same data on both terminals upon synchronization. Those technologies do not take attribute conversion into consideration.

In addition, to keep synchronization between data units, it is not enough to perform data conversion according to the conditions of both synchronizing units. For example, assume that, in the following discussion, all information about a meeting is saved on a desktop personal computer but that only the date and time are saved on a portable terminal.

In this case, data conversion between the personal computer and the terminal while synchronizing data on both units results in a serious problem of data loss as described below.

That is, when data is copied from the desktop personal computer to the portable terminal, unnecessary data is simply deleted. Conversely, when data is copied from the portable terminal to the personal computer, data is insufficient. On the portable terminal described above, information B does not contain information on the participants of the meeting. For example, when a desktop personal computer (called "personal computer A") on which all the meeting information is stored is made to synchronize with a portable terminal on which meeting data composed only of information on the date/time and the place, the data on personal computer A becomes simplified when copied to the portable terminal with the result that information except the date/time and the place is lost.

If the portable terminal is made to synchronize with a desktop personal computer other than personal computer A (called "personal computer B"), the information sent to personal computer B is the simplified meeting information.

Therefore, to save the meeting information stored on personal computer A onto personal computer B, personal computer A and personal computer B must be directly synchronized. When personal computer A is located in an office and personal computer B is located at home, it would be convenient to synchronize personal computer A and personal computer B via a portable terminal. This synchronization cannot be established by the conventional method.

Generally, the present invention seeks to solve the problems associated with the prior art described above. It is an object of the present invention to provide a data processing unit capable of synchronizing data between data processing units with different screen sizes and user attributes and, at the same time, changing information so that information may be displayed according to the respective data processing units.

According to a first aspect of the present invention, there is provided a data display control method for use in a plurality of interconnected data processing units, each of which stores therein data synchronized and transferred between the plurality of data processing units and displays converted data on a display unit of the data processing unit, the converted data being produced by converting data based on a conversion rule for displaying data in a format suitable for a specification of the display unit of the data processing unit or a conversion rule for displaying the data in a format suitable for an attribute of the data processing unit and/or a user.

To achieve the above problems, in a second aspect of the present invention there is provided a data processing system composed of a plurality of interconnected data processing units, wherein each of the plurality of data processing units comprises:

a first storing unit storing therein synchronous data synchronized and transferred between the plurality of data processing units via communication control means;

a second storing unit pre-storing therein a conversion rule for displaying the synchronous data in a display format suitable for display unit specifications of the data processing unit;

conversion means for converting the synchronous data stored in the first storing unit to data corresponding to the display format suitable for displaying on the data processing unit based on the conversion rule; and a third storing unit for storing therein the converted data. In the data processing system, the converted data is displayed on the display unit of the data processing unit.

In a third aspect of the present invention, there is provided a data processing system composed of a plurality of interconnected data processing units, wherein each of the plurality of data processing units comprises:

a first storing unit storing therein synchronous data synchronized and transferred between the plurality of data processing units via communication control means, the synchronous data including a conversion rule for displaying the synchronous data in a display format suitable for display unit specifications of the data processing unit and/or for a user attribute;

a second storing unit pre-storing therein attribute of the data processing unit and a user; conversion means for converting the synchronous data to data suitable for displaying on the data processing unit based on the conversion rule included in the synchronous data and on the attribute data stored in the second storing unit; and a third storing unit storing therein the converted data, and wherein the converted data is displayed on a display unit of the data processing unit.

The conversion rule may include display/non-display setting information for each of predetermined items constituting the synchronous data, and the conversion means may extract data of the items for which the display setting information is specified to create conversion data.

According to a fourth aspect of the present invention, there is provided a data processing unit comprising: means for converting data according to screen display function information on a display unit of the data processing unit and/or user attribute information of the data processing unit; and storing unit storing unconverted data and converted data, wherein the unconverted data is used when synchronizing data with other terminals, and the converted data is used when displaying data on the display unit of the data processing unit.

According to a fifth aspect of the present invention, there is provided a data processing unit comprising:

communication control means for transferring synchronous data to or from other data processing units, storing means for storing the synchronous data; data conversion rule storing means for storing a rule for converting the synchronous data according to screen display function information on a display of the data processing unit and/or user attribute information on the data processing unit; data conversion means for reading the synchronous data from the synchronous data storing means and for converting the synchronous data based on the data conversion rule; converted data storing means for storing the converted data; and display means for displaying the converted data on a screen.

According to a sixth aspect of the present invention, there is provided a data processing unit comprising:

communication control means for transferring synchronous data to or from other data processing units; synchronized data storing means for storing the synchronous data; terminal/user attribute storing means for storing an attribute of the data processing unit and a user of the data processing unit, referred to as "terminal/user attribute" hereinafter; data conversion means for converting the synchronous data read from the synchronous data storing means based on the terminal/user attribute; converted data storing means for storing data converted by the data conversion means; and display means for displaying the converted data.

The data processing unit may include instruction information for converting data based on the terminal/user attribute.

According to a seventh aspect of the present invention, there is provided a medium carrying a program which causes a data processing unit to: operate the program comprising:

(a) (a1) reading synchronous data from a storage unit in which the synchronous data to be transferred to or from other data processing units via a communication control unit is stored, (a2) converting the synchronous data based on a conversion rule stored in a data conversion rule storing unit in which the conversion rule for converting the synchronous data according to screen display function information on a display of the data processing unit and/or a user attribute of the data processing unit is stored, and (a3) outputting the converted data to a converted data storing unit; and (b) controlling a display operation on a screen of the display unit based on the converted data stored in the converted data storing unit.

According to a eighth aspect of the present invention, there is provided a medium carrying a program which causes a data processing unit operate, the program comprising:

(a) (a1) reading synchronous data from a storage unit in which the synchronous data to be transferred to or from other data processing units via a communication control unit is stored, (a2) converting the synchronous data based on a conversion rule for instructing that data be displayed in a format according to screen display function information on a display of the data processing unit and/or user attribute information and on the attribute information stored in a storage unit in which the user attribute information the data processing unit is stored, the conversion rule being included in the synchronous data, and (a3) outputting the converted data to converted data storing means; and (b) controlling a display operation on a screen of the display unit based on the converted data stored in the converted data storing unit.

The medium may be whatever can carry the program in a static, active or dynamic manner, or any carrier like carrier wave carrying program information as signals. The medium may be implemented as a network system or lines, either wired or wireless, or both.

PREFERRED EMBODIMENTS OF THE INVENTION

Figure 1:
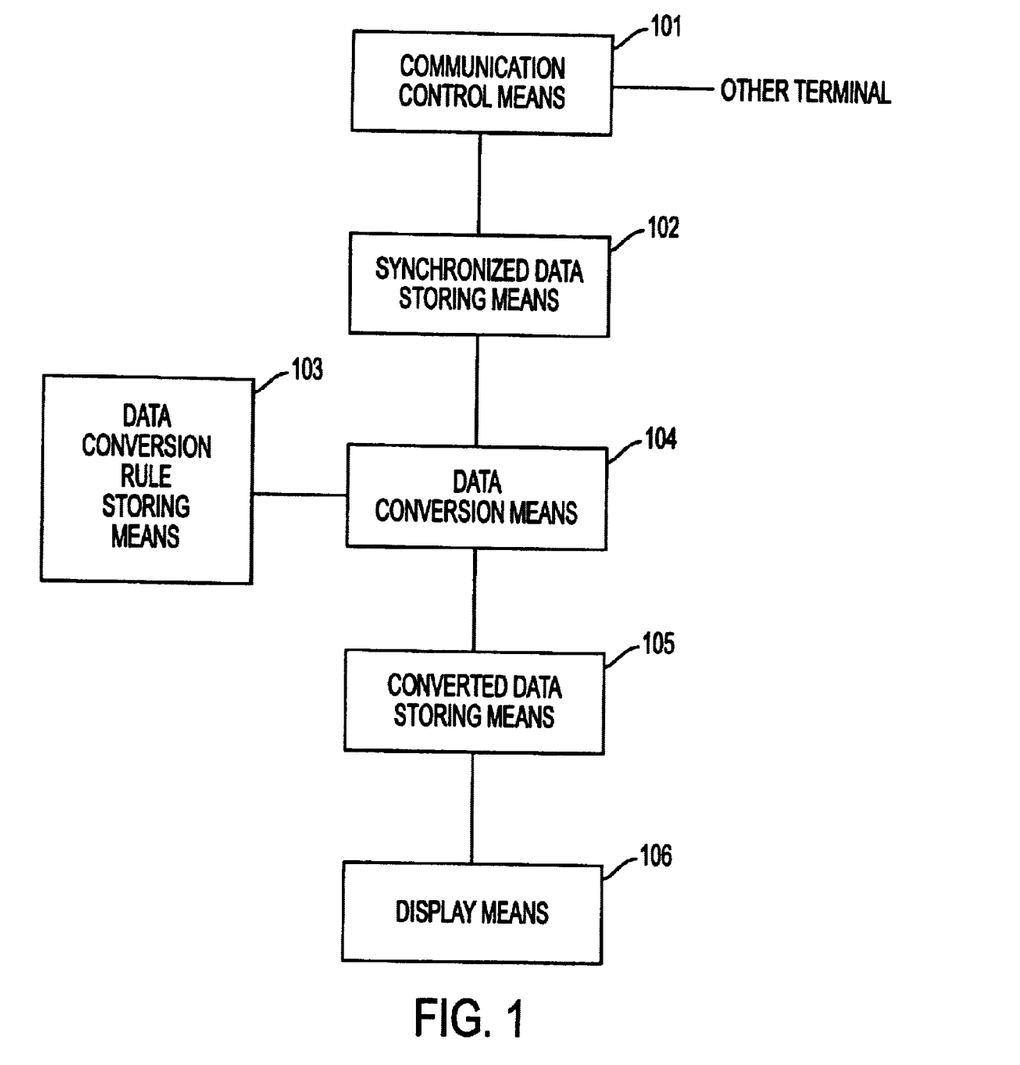
FIG. 1 is a diagram showing the configuration of a data processing unit in an embodiment of the present invention.

The preferred embodiments of the present invention will now be described. Referring to FIG. 1, a data processing unit in an embodiment of the present invention comprises communication control means (101) for communicating with other terminals, synchronized data storing means (102) for storing data synchronized by the communication control means, data conversion rule storing means (103) for storing data conversion rules according to the user attribute, data conversion means (104) for converting data, received from said synchronized data storing means, based on the data conversion rule, converted data storing means (105) for storing data converted by the data conversion means, and display means (106) for displaying data based on the converted data stored in the converted data storing means.

The data processing unit synchronizes data with other data processing units via the communication control means (101), saves the synchronized data in the synchronized data storing means (102), converts the data based on the rules stored in the data conversion rule storing means (103), saves the resulting converted data into the converted data storing means (105), and displays the data on the display means (106). For synchronizing data with other data processing units, the communication control means (101) controls synchronization based on data stored in the synchronized data storing means (102).

Figure 7:
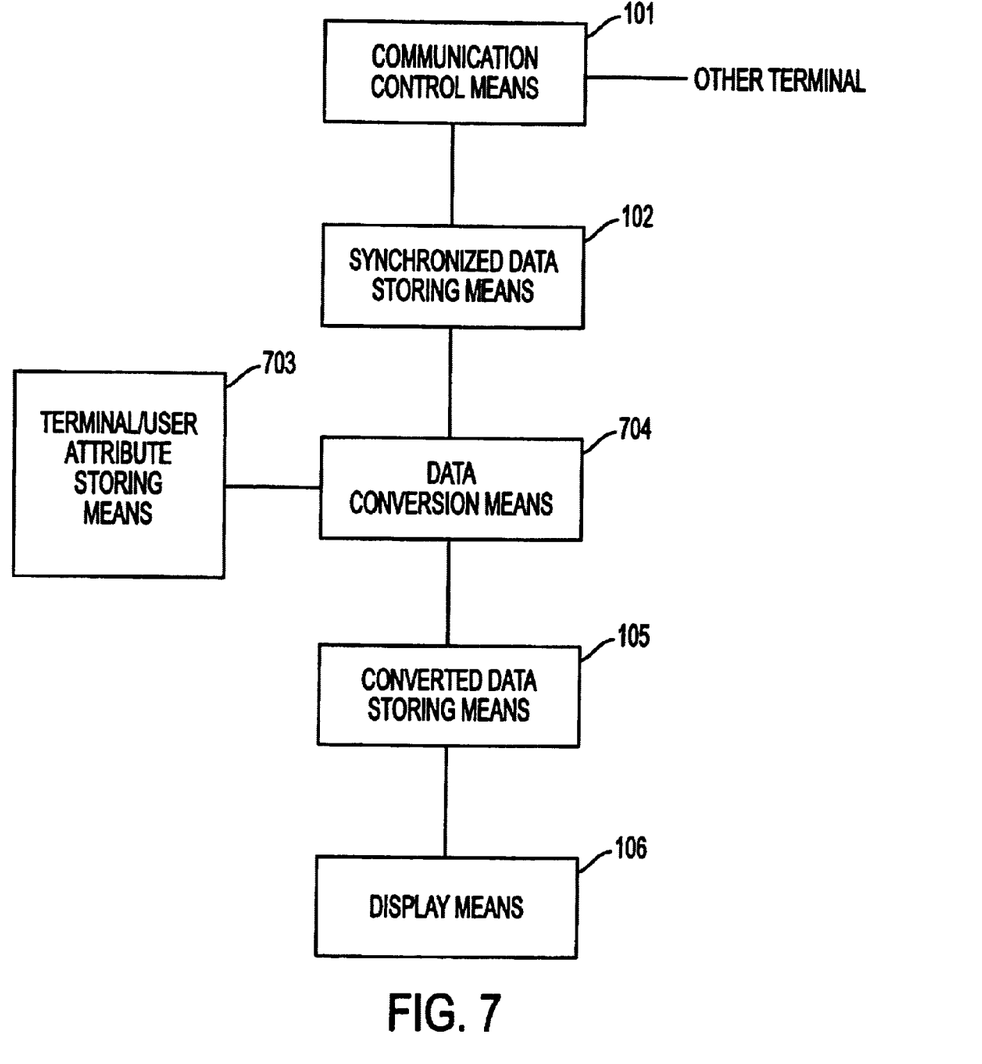
FIG. 7 is a diagram showing a second embodiment of the present invention.
Figure 8:
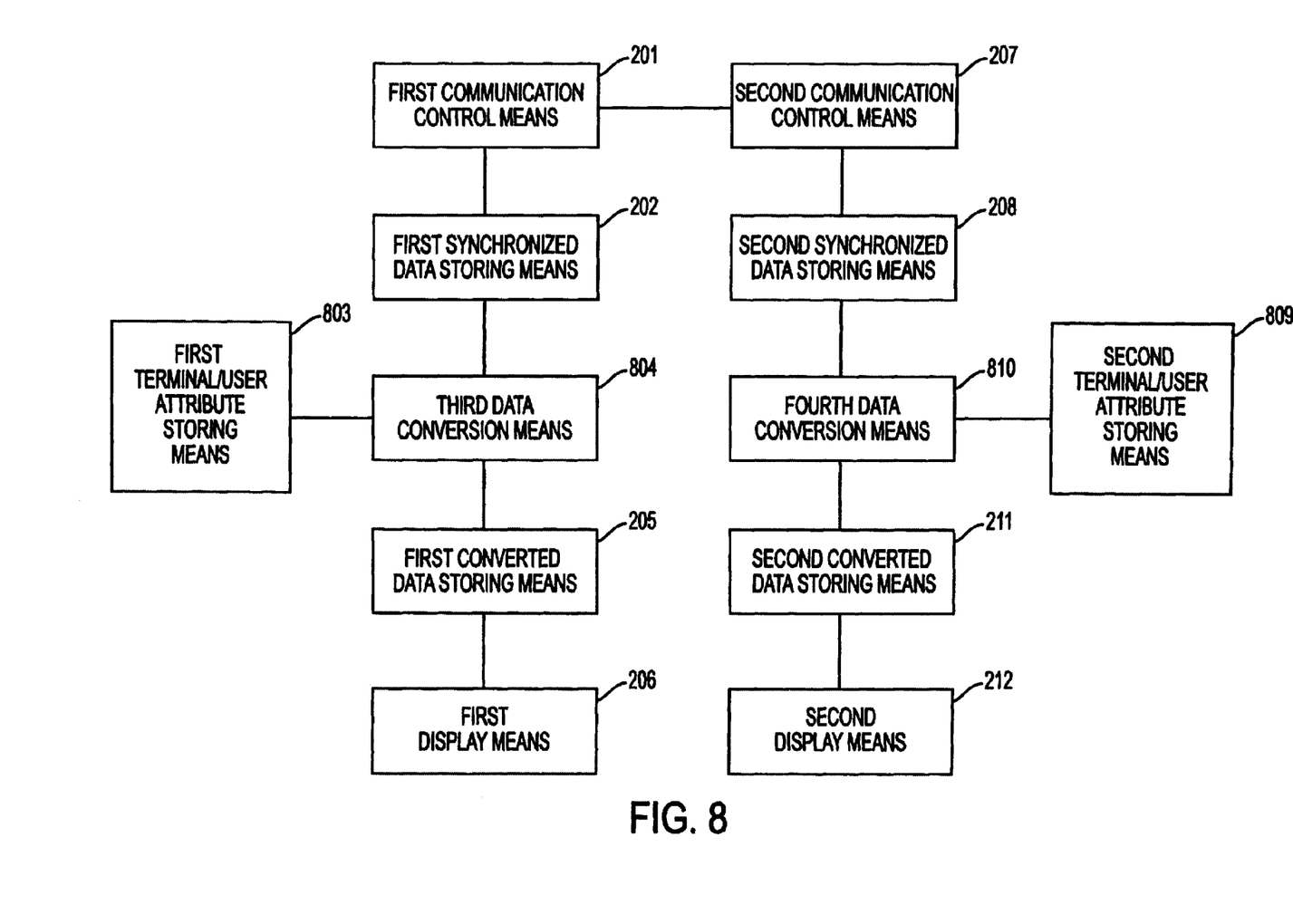
FIG. 8 is a diagram showing the system configuration in which a plurality of units in the second embodiment of the present invention are interconnected.

A data processing unit in a second embodiment of the present invention stores into the synchronization data the rules for converting data to the one compatible with the screen display specifications. Referring to FIG. 7, a data processing unit in the second embodiment of the present invention comprises communication control means (101) for communicating with other terminals, synchronized data storing means (102) for storing data synchronized by the communication control means, terminal/user attribute storing means (703) for storing the attributes of terminals and those of the users using the terminals, data conversion means (704) for converting data, received from said synchronized data storing means, based on the conversion rules included in the data and on the terminal/user attributes, converted data storing means (105) for storing data converted by the data conversion means, and display means (106) for displaying data based on the converted data stored in the converted data storing means.

The data processing unit in this mode synchronizes data with other data processing units via the communication control means (101), saves the synchronized data into the synchronized data storing means (102), converts the data based on the conversion rules included in the synchronization data and the rules stored in the terminal/user attribute storing means (703), saves the resulting converted data into the converted data storing means (105), and displays the data on the display means (106) based on the converted data saved in the converted data storing means (105). For synchronizing data with other data processing units, the communication control means (101) controls synchronization based on data stored in the synchronized data storing means (102).

In the embodiments of the present invention, the function and the processing of at least the data conversion means and the display means for displaying converted data on the display unit may be implemented by a program executed on a processor constituting the processor of the data processing unit. That is, a program which causes a data processing unit to (a) read synchronous data from a storage unit in which the synchronous data to be transferred to or from other data processing units via a communication control unit is stored, convert the synchronous data based on a conversion rule stored in a data conversion rule storing unit in which the conversion rule for converting the synchronous data according to screen display function information on a display of the data processing unit and/or a user attribute of the data processing unit is stored, and output the converted data to a converted data storing unit; and (b) control a display operation on a screen of the display unit based on the converted data stored in the converted data storing unit, may be stored on a medium such as a floppy disk or a CD-ROM. The program may be read from the recording medium for execution on the processor.

Alternatively the invention may be carried out by reading out a program from a medium and execute it by a data processing unit. Namely, the program causes the data processing unit (a) to read synchronous data from a storage unit in which the synchronous data to be transferred to or from other data processing units via a communication control unit is stored, convert the synchronous data based on a conversion rule for displaying data in a format according to screen display function information on a display of a data processing unit and on a conversion rule stored in the storage unit in which the conversion rule for converting the synchronous data according to the conversion rule and attribute information on a user of the data processing unit, the conversion rule being included in the synchronous data, and output the converted data to converted data storing means. The program further causes the processing unit (b) to control a display operation on a screen of the display unit based on the converted data stored in the converted data storing unit. The program may be stored on a recording medium and may be read from the recording medium for execution on the processor.

When the user wants to synchronize data between a plurality of terminals, each with its own terminal attribute or user attribute, to display the data on the terminals, for example, when an individual user wants to synchronize an address book, a scheduler, a mail box, files, and so on between a desktop personal computer and a portable terminal, the data processing unit in the embodiments of the present invention converts display data according to the terminal attribute. This capability allows the data processing unit to display data compatible both with powerful personal computers having a large screen and with small-size terminals such as a pager.

DETAILED DESCRIPTION OF THE EMBODIMENTS

The present invention will be described in detail by referring to the attached drawings. FIG. 1 is a block diagram showing the configuration of an embodiment. Referring to FIG. 1, a data processing unit in the embodiment comprises communication control means 101, synchronized data storing means 102, data conversion rule storing means 103, data conversion means 104, converted data storing means 105, and display means 106.

The communication control means 101 allows the data processing unit to synchronize data with other data processing units. Physically, the communication control means 101 is connected to other data processing units with a cable such as an RS232C cable or via radio waves such as an infrared light.

Synchronization may be started automatically if a linked partner (other terminal) is a synchronizing partner (a partner with which data is transferred in synchronous mode).

The synchronized data storing means 102, composed of storage means such as a disk unit or a memory, stores data that is synchronized with data on other terminals (that is, data compatible and identical with data on other terminals) under control of the communication control means 101.

The data conversion rule storing means 103, composed of storage means such as a disk unit or a memory, stores the conversion rules for data stored in the synchronized data storing means 102.

The data conversion means 104 converts synchronized data stored in the synchronized data storing means 102 based on the conversion rules stored in the data conversion rule storing means 103.

The converted data storing means 105, composed of storage means such as a disk unit or a memory, stores synchronized data converted by the data conversion means 104.

The display means 106, composed of a CRT or an LCD (liquid crystal display), displays thereon data stored in the converted data storing means 105.

Figure 3:
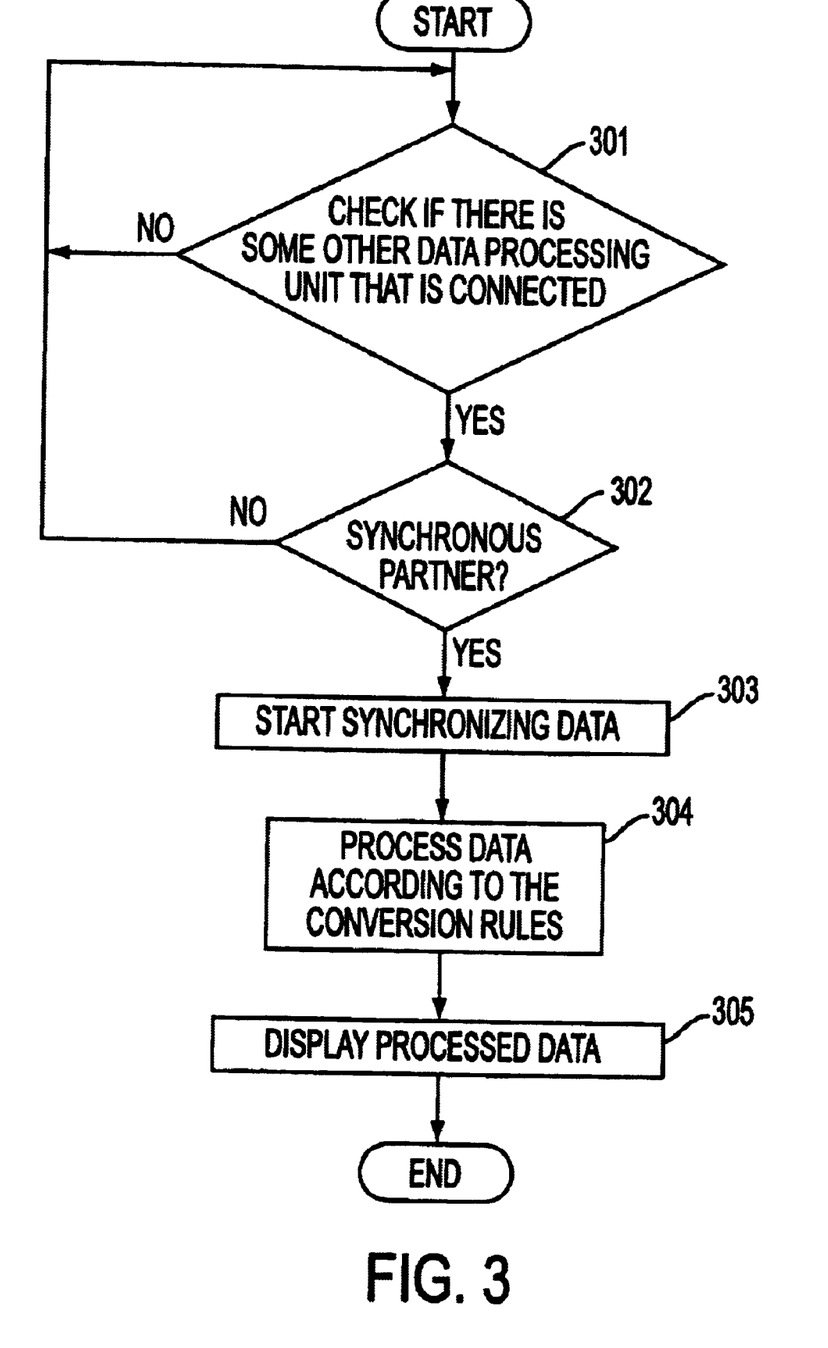
FIG. 3 is a flowchart showing the processing procedure of the embodiment of the present invention.

FIG. 3 is an example of a flowchart showing the flow of the processing in the first embodiment of the present invention.

First, the communication control means 101 checks if there is some other data processing unit that is connected to the local data processing unit. If there is such a data processing unit (YES in step 301), the communication control means 101 checks if that partner is a synchronous partner with which data is synchronized (step 302).

Once the communication control means 101 has confirmed that the partner is a synchronous partner (YES in step 302), it starts synchronizing data (step 303), processes it according to the conversion rules (step 304), and displays the processed data on the screen (step 305).

Figure 4:
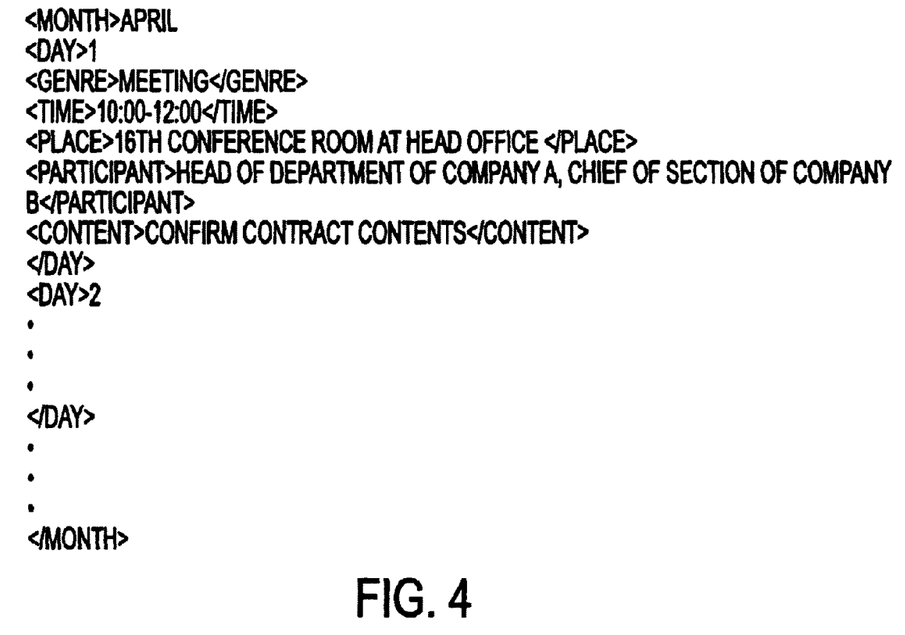
FIG. 4 is a diagram showing an example of synchronization data for illustrating the embodiment of the present invention.

FIG. 4 shows an example of synchronous data. FIG. 4 is a diagram showing an example of personal schedule data about a schedule for April 1. A part enclosed by "<" and ">" is an item header. A part enclosed by "</" and ">" indicates the end of an item. For example, "10:00–12:00" enclosed by <time> and </time> indicates time information. The synchronous data shown in FIG. 4 means that "from 10:00 to 12:00 on April 1, a meeting is to be held with the head of a department of company A and the chief of a section of company B in the 16th conference room at the head office to confirm the contents of the contract". Schedules for April 2 and the following dates are omitted.

Figure 5:
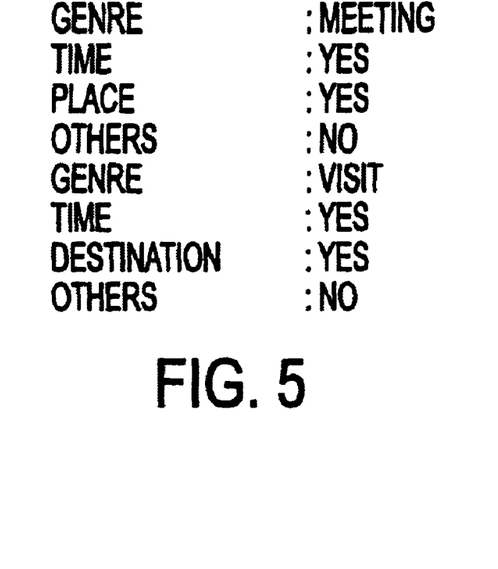
FIG. 5 is a diagram showing an example of a data conversion rule for illustrating the embodiment of the present invention.

Next, FIG. 5 shows an example of data conversion rules to be used by the data conversion means 104 of the data processing unit that receives synchronous data such as the one shown in FIG. 4. The item "Genre: Meeting" indicates that the conversion rules for the items belonging to the genre are described on the indented lines that follow. In the example shown in FIG. 5, "YES" indicates that the item will survive after conversion, and "NO" indicates that the item will be omitted after conversion. More specifically, for the conversion rules concerning the genre "Meeting" shown in FIG. 5, information only on "Time" and "Place" will survive, and other information will be omitted from the conversion rules.

Figure 6:
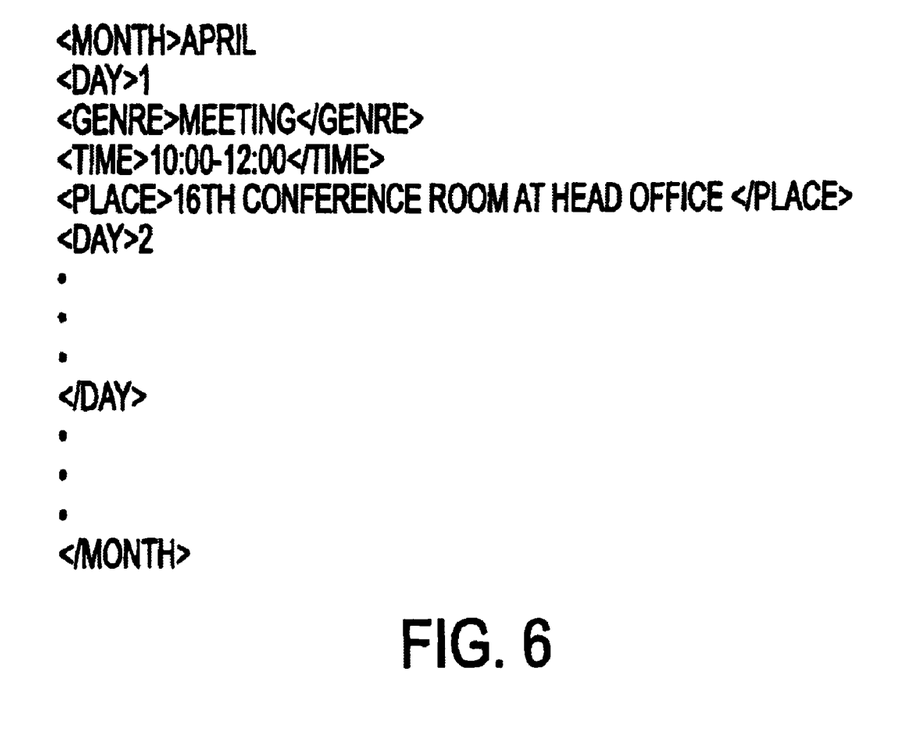
FIG. 6 is a diagram showing an example of converted data for illustrating the embodiment of the present invention.

FIG. 6 shows the resulting data produced by applying the data conversion rules shown in FIG. 5 to the synchronous data shown in FIG. 4. The notation used in FIG. 6 is the same as that of the data shown in FIG. 4. In the example shown in FIG. 6, information only on "Time" and "Place" has survived, indicating that "a meeting is to be held in the $16^{th}$ conference room at the head office from 10:00 to 12:00 on April 1 ".

It should be noted that the synchronous data shown in FIG. 4, the conversion rules shown in FIG. 5, and the converted data shown in FIG. 6 are only examples used to describe the embodiment of the present invention. They are shown as an example in which conversion rules are applied to synchronous data to produce converted data. The present invention is not limited to this configuration.

In an embodiment of the present invention, both unconverted synchronous data and converted synchronous data are stored. For example, on a portable terminal on which the synchronous data shown in FIG. 4 is saved but is displayed in a simplified format, the synchronous data is once converted to the data shown in FIG. 6 and both the converted data and the unconverted data are saved.

And, the detailed-format data such as the one shown in FIG. 4 is used to synchronize data with other data processing units via the communication control means, while the simple-format data such as the one shown in FIG. 6 is used to display data on the screen.

Figure 2:
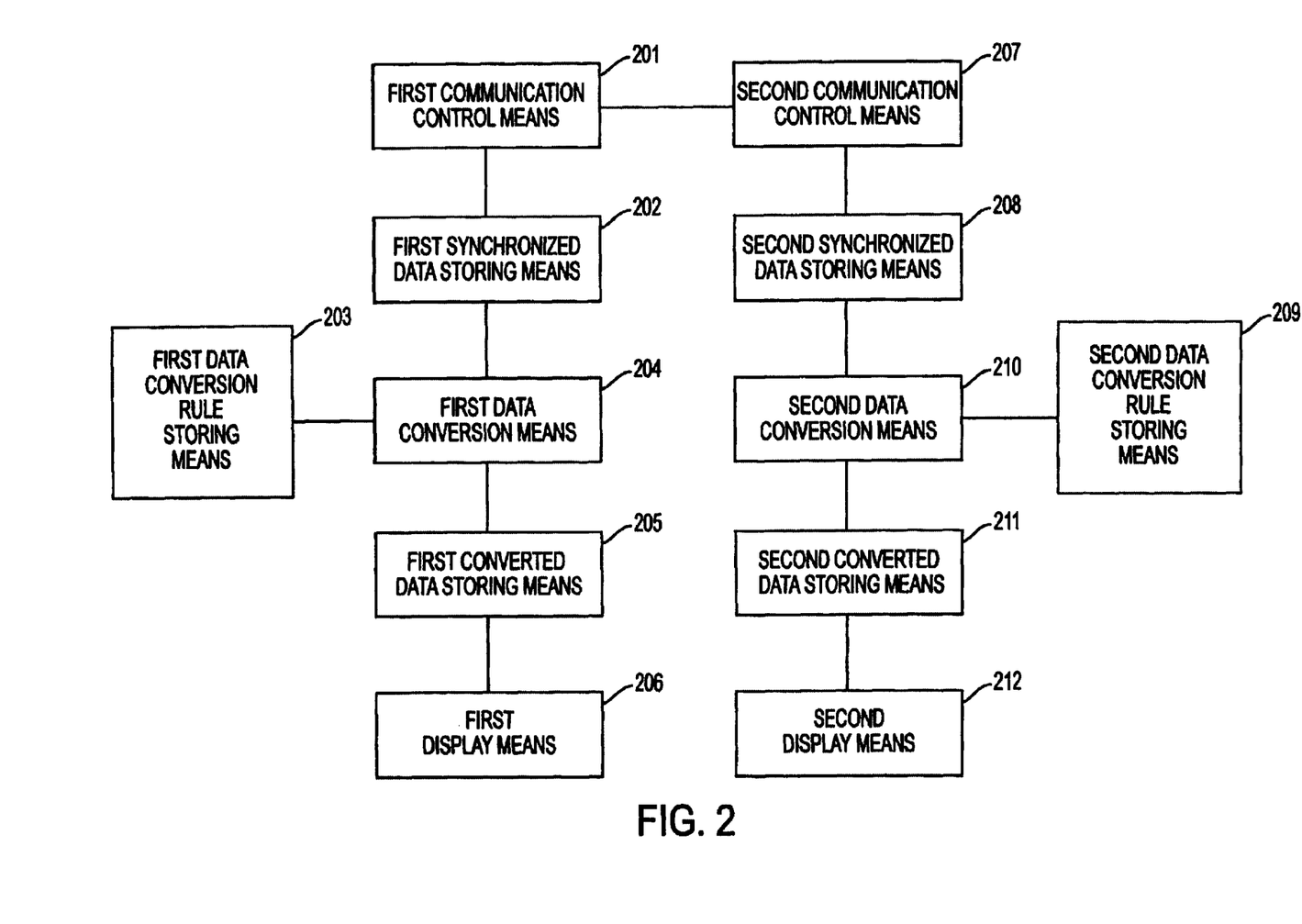
FIG. 2 is a diagram showing the system configuration in which a plurality of units in the embodiment of the present invention are interconnected for synchronization.

FIG. 2 is a diagram showing an example of the system configuration according to an embodiment of the present invention. The figure shows the configuration of a system in which the data processing units shown in FIG. 1 is linked to a like system. On a first data processing unit and a second data processing unit, data synchronized by first communication control means 201 and second communication control means 207 is saved into first synchronized data storing means 202 and second synchronized data storing means 208, respectively. The data is converted by the conversion rules stored in first data conversion rule storing means 203 and second data conversion rule storing means 209, respectively. The data converted by first data conversion means 204 and second data conversion means 210 is saved into first converted data storing means 205 and second converted data storing means 211, respectively.

The data stored in the first synchronized data storing means 202 is the same as that stored in the second synchronized data storing means 208 after the synchronization operation, whereas the data stored in the first converted data storing means 205 is different from that stored in the second converted data storing means 211 if the conversion rules are different. The data stored in the first converted data storing means 205 and that stored in the second converted data storing means 211 are displayed on first display means 206 and second display means 212, respectively.

FIG. 7 is a block diagram showing the configuration of a second embodiment of the present invention. In FIG. 7, communication control means 101, synchronized data storing means 102, converted data storing means 105, and display means 106 are the same as those used in the embodiment described by referring to FIG. 1.

Terminal/user attribute storing means 703, composed of storage means such as a disk unit or a memory, stores thereon data processing unit attributes or terminal user attributes.

Data conversion means 704 converts synchronous data stored in the synchronized data storing means 102 based on the terminal and user attributes stored in the terminal/user attribute storing means 703.

In the second embodiment of the present invention, the data conversion rules are pre-stored, not in the data processing unit but in the synchronous data. The data conversion means 704 converts data based on the data conversion rules imbedded in the synchronous data and on the terminal/user attributes stored in the terminal/user attribute storing means 703.

Figure 9:
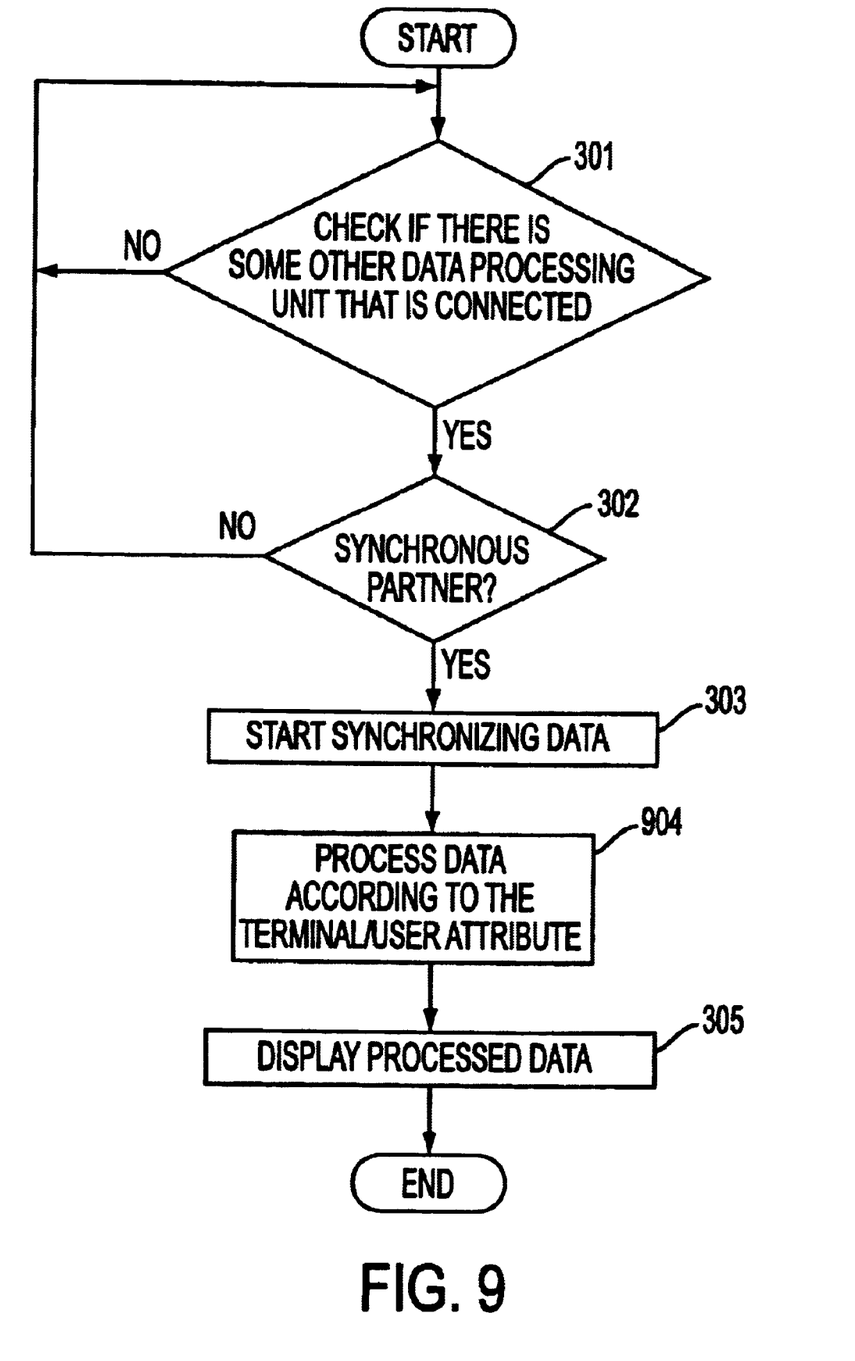
FIG. 9 is a flowchart showing the processing procedure of the second embodiment of the present invention.
Figure 10:
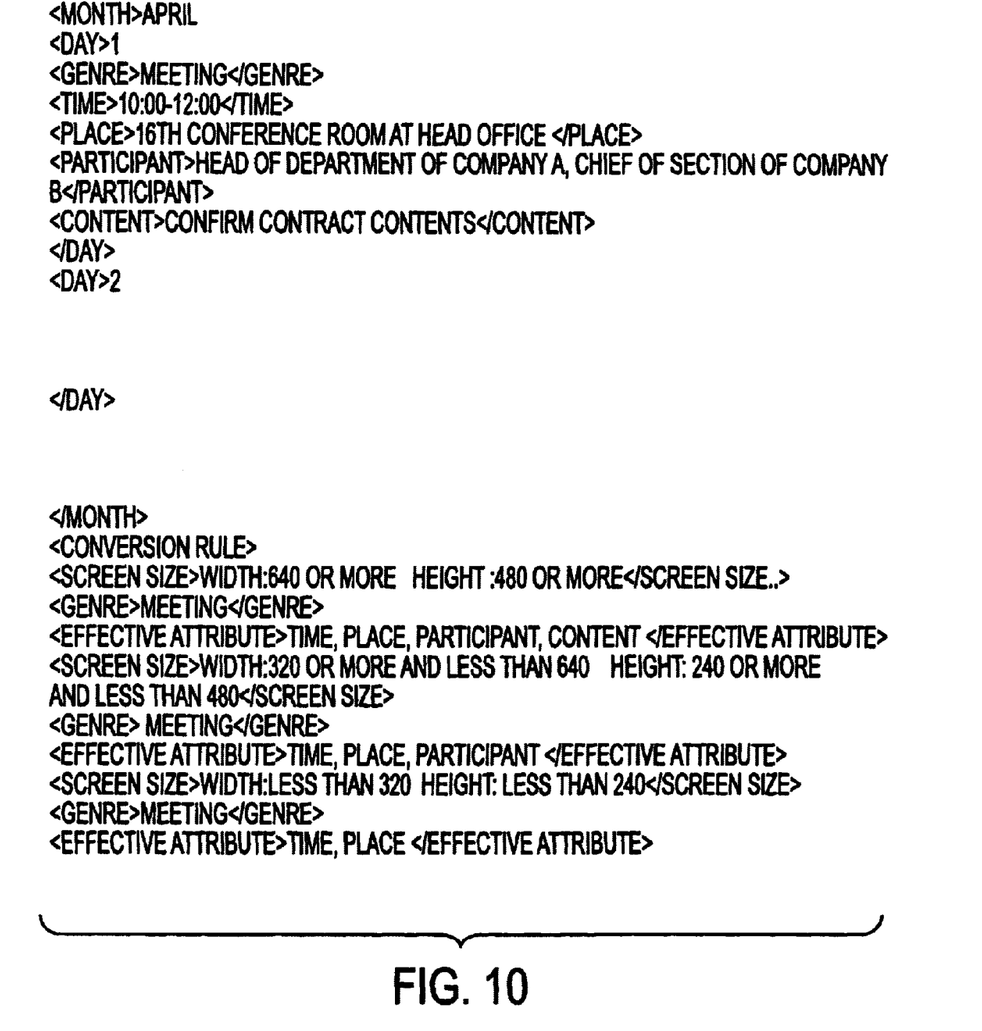
FIG. 10 is a diagram showing an example of synchronization data for illustrating the second embodiment of the present invention.

FIG. 9 is a flowchart showing the processing procedure of the second embodiment of the present invention. Referring to FIG. 9, the processing procedure differs from that shown in FIG. 3 in step 904. The procedure will be described using FIGS. 10 and 6. FIG. 10 is a diagram showing an example of synchronous data that is obtained by a data processing unit that synchronizes data with some other data processing unit. The synchronous data is stored in the synchronized data storing means 102 shown in FIG. 7.

In FIG. 10, the lines from <month> to </month> contain schedule data similar to that shown in FIG. 4. Lines after </month>, on the other hand, describe data conversion rules. The data conversion rules describe how data before the line containing </month> will be converted according to the terminal screen attribute.

For example, the description between <screen size> and </screen size> and the two lines following it indicate that "on a terminal with a screen width of at least 640 and a screen height of at least 480, the four items (time, place, participants, and contents) will survive after conversion if there is schedule data belonging to the meeting "genre".

The subsequent three lines, after, jumping 4 lines, indicate that "on a terminal with a screen width of less than 320 and a screen height of less than 240, the two items (time and place) will survive after conversion if there is schedule data belonging to the meeting "genre".

When there is such synchronous data, that is, when the terminal/user attribute storing means 703 stores thereon the terminal screen size of "width 240 and height 160", only the time and place information will survive as the meeting schedule data.

Figure 11:
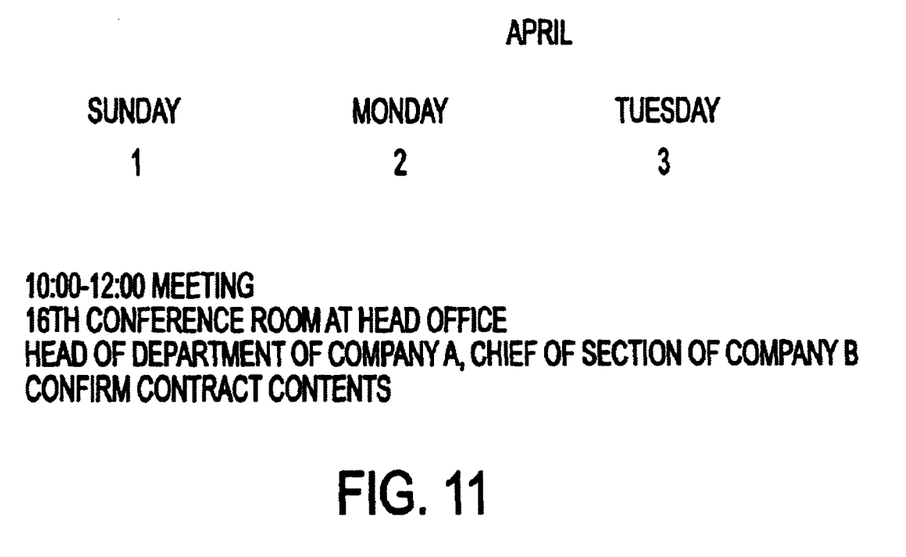
FIG. 11 is a diagram showing an example of schedule data displayed on the data processing unit for illustrating the second embodiment of the present invention.
Figure 12:
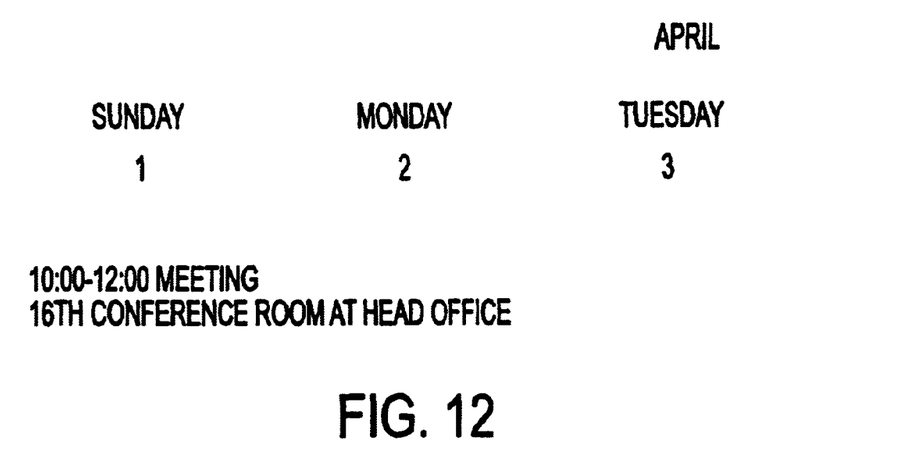
FIG. 12 is a diagram showing an example of schedule data displayed on some other data processing unit for illustrating the second embodiment of the present invention.

That is, out of the data shown in FIG. 10, only the time data "10:00–12:00" and the place data "$16^{th}$ conference room at the head office" will survive. FIG. 11 shows an example in which the schedule data on April 1 is displayed, for example, on a terminal with the width of at least 640 and the height of at least 480 without omitting any meeting information. On the other hand, FIG. 12 shows an example in which the same schedule data is displayed on a terminal with the width of 240 and the height of 160. In the example shown in FIG. 12, the meeting information has been simplified to that composed only of time and place information. And, the simplified information saying "from 10:00 to 12:00 on April 1, a meeting is to be held in the $16^{th}$ conference room at the head office" is displayed.

Note that, not only the terminal attribute but also the user attribute may be included in the conversion rules that will be applied to the data shown in FIG. 10. For example, when a conversion rule stipulating that participant information is displayed when the user belongs to department A but it is not displayed when the user belongs to department C is included, data is processed differently according to the department to which the user belongs and the corresponding data is displayed on the screen in response to the user's entry of department information.

The meritorious effects of the present invention are summarized as follows.

As described above, when data is synchronized between a plurality of terminals, each with its own terminal attribute or user attribute, and is displayed on each of the terminals, the data processing unit according to the present invention converts the display data according to the terminal attribute. Thus, synchronous data, which is displayed both on a powerful terminal with a large screen and on a small portable terminal such as a pager, is not lost. The data is displayed in a format suitable for each terminal.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A data processing system composed of a plurality of interconnected data processing units, wherein each of said plurality of data processing units comprises:
   a first storing unit storing therein synchronous data synchronized and transferred between the plurality of data processing units via communication control means;
   a second storing unit pre-storing therein a conversion rule for displaying said synchronous data in a display format suitable for display unit specifications of the data processing unit and/or for a user attribute;
   conversion means for converting said synchronous data stored in said first storing unit to data corresponding to the display format suitable for displaying on the data processing unit based on said conversion rule stored in said second storing unit; and a third storing unit storing therein said converted data, wherein said converted data is displayed on a display unit of the data processing unit.

2. A data processing system composed of a plurality of interconnected data processing units, wherein each of said plurality of data processing units comprises:

a first storing unit storing therein synchronous data synchronized and transferred between the plurality of data processing units via communication control means, said synchronous data including a conversion rule for displaying said synchronous data in a display format suitable for display unit specifications of the data processing unit and/or for a user attribute;

a second storing unit pre-storing therein attribute of the data processing unit and a user;

conversion means for converting said synchronous data stored in said first storing unit to data suitable for displaying on the data processing unit based on said conversion rule included in said synchronous data and on the attribute data stored in said second storing unit; and a third storing unit storing therein said converted data, wherein said converted data is displayed on a display unit of the data processing unit.

3. The data processing system as defined by claim 1 wherein said conversion rule includes display/non-display setting information for each of predetermined items constituting said synchronous data and wherein said conversion means extracts data of the items for which the display setting information is specified to create conversion data.

4. The data processing system as defined by claim 2 wherein said conversion rule includes display/non-display setting information for each of predetermined items constituting said synchronous data and wherein said conversion means extracts data of the items for which the display setting information is specified to create conversion data.

* * * * *